(12) United States Patent
Neumann et al.

(10) Patent No.: US 7,954,888 B2
(45) Date of Patent: Jun. 7, 2011

(54) BODY STRUCTURE OF A REAR PART

(75) Inventors: Wolfgang Neumann, Eberdingen (DE); Holger Hahlweg, Calw (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 0 days.

(21) Appl. No.: 12/612,761

(22) Filed: Nov. 5, 2009

(65) Prior Publication Data

US 2010/0148539 A1   Jun. 17, 2010

(30) Foreign Application Priority Data

Dec. 12, 2008  (DE) .......................... 10 2008 062 009

(51) Int. Cl.
*B60J 7/00*   (2006.01)
(52) U.S. Cl. .............................. 296/193.08; 296/193.04
(58) Field of Classification Search ............. 296/203.01, 296/204, 203.04, 193.08, 193.03, 193.04, 296/193.05
See application file for complete search history.

(56) References Cited

U.S. PATENT DOCUMENTS

| | | | |
|---|---|---|---|
| 4,618,163 A | 10/1986 | Hasler et al. | |
| 2001/0020795 A1* | 9/2001 | Toba et al. | 296/195 |
| 2006/0237996 A1* | 10/2006 | Eipper et al. | 296/193.04 |
| 2009/0295195 A1 | 12/2009 | Pietroni | |

FOREIGN PATENT DOCUMENTS

| | | |
|---|---|---|
| DE | 33 46 986 A1 | 7/1985 |
| DE | 102005050961 A1 | 5/2007 |
| DE | 10 2006 014 979 A1 | 10/2007 |
| DE | 102006014402 A1 | 10/2007 |
| DE | 602005003588 T2 | 10/2008 |

* cited by examiner

*Primary Examiner* — Joseph D Pape

(57) ABSTRACT

A body structure of a rear part of a motor vehicle contains at least two side walls, each having a side wall element, and a bulkhead with a cross member on the ground side. The cross member is provided with rearwardly open mounts into which a front end region of the respective side wall element is pushed and is welded and/or riveted to the cross member.

9 Claims, 2 Drawing Sheets

BODY STRUCTURE OF A REAR PART

CROSS-REFERENCE TO RELATED APPLICATION

This application claims the priority, under 35 U.S.C. §119, of German application DE 10 2008 062 009.2, filed Dec. 12, 2008; the prior application is herewith incorporated by reference in its entirety.

BACKGROUND OF THE INVENTION

Field of the Invention

The present invention relates to a body structure of a rear part of a motor vehicle. The invention also relates to a motor vehicle equipped with a body structure of this type.

Published, German patent application DE 33 46 986 A1, corresponding to U.S. Pat. No. 4,618,163, discloses a body structure of the type in question of a rear part of a motor vehicle and in particular a complete car body. In the case of the latter, extruded profiles produced from a light metal in conjunction with junction elements composed of a light metal casting form the supporting structure in which the ends of the extruded profiles are held by mounts corresponding in a form-fitting manner to the cross-sectional shape thereof in the junction elements. The intention with the known body structure is in particular to produce small-series bodies more cost-effectively.

Published, German patent application DE 10 2006 014 979 A1 discloses a supporting structure for a motor vehicle, with a cast longitudinal member element which is configured at least in some sections as an open profile and which also has a first connecting section for the fastening of a longitudinal member and a second connecting section for the fastening of a seal of the supporting structure, one at each end. For a simple construction of the supporting structure, the second connecting section is configured as an extension of the open profile, and the extension together with a closure element forms a transverse supporting section which is oriented transversely with respect to the longitudinal extent of the longitudinal member element. Furthermore, both the seal and a cross member running in a direction away from the seal are fastened to the transverse supporting section. A supporting structure which is constructed in a simple manner and is optimized with respect to its rigidity is to be provided by this formation.

SUMMARY OF THE INVENTION

It is accordingly an object of the invention to provide a body structure of a rear part which overcomes the above-mentioned disadvantages of the prior art devices of this general type, which provides an improved connection of individual components of the body structure to one another.

The invention is based on the general concept of connecting individual components of a body structure of a rear part of a motor vehicle to one another not only, for example, via a cohesive material joint but in addition via a form-fitting connection. The body structure according to the invention has at least two side walls, each having a side wall element, and a bulkhead with a cross member on the ground side. The cross member is provided, at each longitudinal end, with rearwardly open mounts into which a front end region of the respective side wall element is pushed and, as a result, held in a form-fitting manner. The respective side wall element is connected to the cross member in this case in the region of the mount, which is of a shoe-like configuration, via a welded joint and/or a riveted joint. In contrast to a pure cohesive material joint between the side wall elements and the cross member, the mounts provided, according to the invention, on the cross member also make it easier to assemble the body structure, since they already enable the side wall elements to be prefixed or oriented relative to the cross member by the side wall elements being pushed into the mount of a shoe-like configuration on the cross member. If the respective side wall element is positioned in the cross member in such a manner, it can be connected thereto in this region by a suitable connecting process, in particular by a welding or riveting process. The body structure according to the invention therefore provides a simplified possibility of assembly and, in addition to a purely cohesive material joint, also a form-fitting connection between the individual components of the body structure, thus improving the introduction of force and transmission of force between the individual components, which is of great significance in particular in the event of a crash.

In an advantageous development of the solution according to the invention, the cross member and the two side wall elements are formed from a light metal diecasting. For example, aluminum is suitable as a possible material for the light metal diecasting, aluminum being both light and corrosion-resistant, which is likewise highly advantageous in motor vehicle manufacturing and in particular in sports car manufacturing. Furthermore, with a cross member and side wall elements configured in such a manner, it is possible to produce them cost-effectively and with a high degree of dimensional accuracy, thus enabling a favorable, but at the same time high-quality manufacturing.

In an advantageous development of the solution according to the invention, the cross member and the side wall elements are connected to one another via self-piercing rivets. In contrast to hollow or blind rivets, pre-drilling is not required for the self-piercing riveting process according to the invention, as a result of which the process can be used comparatively economically. In general, riveting processes provide a fixed, nonreleasable connection which, for example in comparison to screw connections, customarily also does not exhibit any weakening of the connecting force in the long term.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a body structure of a rear part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Preferred exemplary embodiments of the invention are illustrated in the drawings and are explained in more detail in the description below in which identical reference numbers refer to identical or similar or functionally identical components.

DETAILED DESCRIPTION OF THE INVENTION

Figure 1:
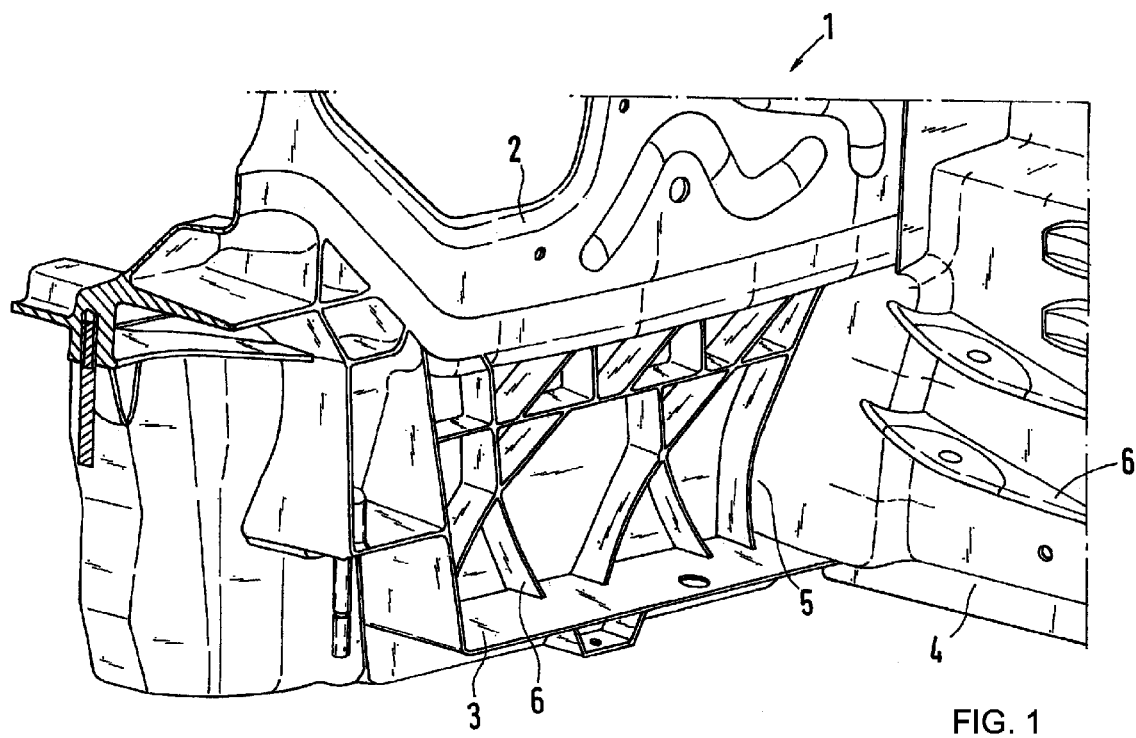
FIG. 1 is a diagrammatic, perspective view of a body structure according to the invention in a region of a connection of a side wall element to a cross member.
Figure 2:
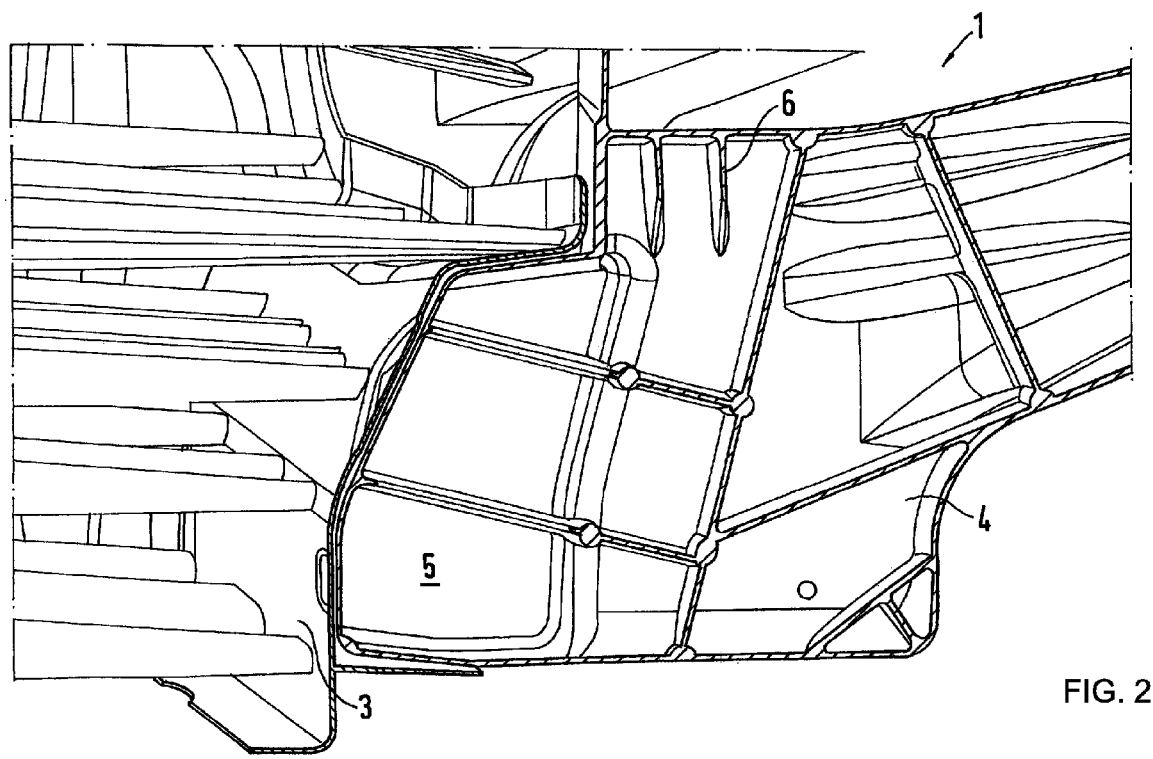
FIG. 2 is a diagrammatic, partially sectioned view of the body structure according to FIG. 1.

Referring now to the figures of the drawing in detail and first, particularly, to FIG. 1 thereof, there is shown a body structure 1 according to the invention that has a bulkhead 2 which runs substantially in a transverse direction of a vehicle and customarily separates a passenger compartment from a rear space located there behind in a direction of travel, in particular an engine compartment. In this case, the bulkhead 2 is connected at its lower edge region to a cross member 3 which, for its part, is connected at each of its longitudinal ends to a side wall element 4. There is customarily a cohesive material joint, for example a welded joint, between the side wall element 4 and the cross member 3, and, of course, other types of connection, such as, for example, adhesive bonding or riveting, are conceivable. According to the invention, the cross member 3 is provided with rearwardly open mounts 5 into which a front end region of the respective side wall element 4 is pushed and is welded and/or riveted to the cross member 3. The cross member 3 therefore has, at each longitudinal end, a mount 5 in which the front end region of the side wall element arranged in each case on this side engages. By use of the mount 5 which is of a shoe-shaped configuration, a form-fitting connection can be achieved between the side wall element 4 and the cross member 3, thus improving the transmission of force and also facilitating assembly of the body structure 1 according to the invention.

The cross member 3 and the two side wall elements 4 are preferably formed from a light metal diecasting, in particular from diecast aluminum, and each have numerous stiffening contours 6, in particular reinforcing ribs, with which the respective component is reinforced in order to absorb corresponding loads. The stiffening contours 6 can be defined in advance with regard to their position, their orientation and their strength, for example by a relevant calculation program, in particular by a "finite-element program", such that they are arranged only at those points at which they are actually required because of the loads which occur there. As an alternative to forming the two side wall elements as diecast aluminum parts, it is also conceivable for them to be formed as diecast magnesium parts.

The two side wall elements 4 are in contact with corresponding wall sections of the cross member 3 preferably only in some regions in the respective, associated mount 5 of the cross member 3, as a result of which an at least small relative movement between the two components 3 and 4 is still possible, but a reliable transmission of force can be ensured. The side wall elements 4 and the cross member 3 can be connected, for example, via self-piercing rivets or via an adhesive bond, and also via a cohesive material joint already mentioned above, for example by welding.

With the mounts 5 provided, according to the invention, on the cross member 3, a good transmission of force between the side wall elements 4 and the cross member 3 can be achieved, which has a positive effect in particular in the event of a crash, and, furthermore, the assembly of the body structure 1 can also be simplified, since the side wall elements 4 can already be prepositioned or prealigned with respect to the cross member 3 by the front end regions of the side wall elements 4 being inserted into the associated mounts 5 on the cross member 3. The connection, which is pre-aligned in such a manner, between the cross member 3 and the side wall elements 4 is fixed only in a subsequent manufacturing step by a relevant connecting process, for example adhesive bonding or welding.

The invention claimed is:

1. A body structure of a rear part of a motor vehicle, the body structure comprising:
    at least two side walls each having a side wall element and a front end region; and
    a bulkhead with a cross member, said cross member having rearwardly open mounts into which said front end region of said side wall element is pushed and is at least one of welded and riveted to said cross member.

2. The body structure according to claim 1, wherein said cross member and said two side wall elements are formed from a light metal diecasting.

3. The body structure according to claim 1, wherein said two side wall elements and said cross member are configured as one of a diecast aluminum part and a magnesium part.

4. The body structure according to claim 1, wherein:
    said cross member has corresponding wall sections; and
    said two side wall elements are in contact with said corresponding wall sections of said cross member only in some regions in said respective mount of said cross member.

5. The body structure according to claim 1, further comprising self-piercing rivets, said side wall elements and said cross member are connected to each other via said self-piercing rivets.

6. The body structure according to claim 1, wherein said side wall elements and said cross member are adhesively bonded to each other.

7. The body structure according to claim 1, further comprising stiffening contours disposed on at least one of said side wall elements and said cross member.

8. The body structure according to claim 7, wherein said stiffening contours are reinforcing ribs.

9. A motor vehicle, comprising:
    a body structure containing at least two side walls each having a side wall element and a front end region, and a bulkhead with a cross member, said cross member having rearwardly open mounts into which said front end region of said side wall element is pushed and is at least one of welded and riveted to said cross member.

* * * * *